(12) United States Patent
Remick

(10) Patent No.: US 8,418,658 B1
(45) Date of Patent: Apr. 16, 2013

(54) ULTRA CHOKE FREE HARNESS SYSTEM

(76) Inventor: Gary L. Remick, Surfside Beach, SC (US)

( * ) Notice: Subject to any disclaimer, the term of this patent is extended or adjusted under 35 U.S.C. 154(b) by 110 days.

(21) Appl. No.: 12/928,857

(22) Filed: Dec. 22, 2010

(51) Int. Cl.
*A01K 27/00* (2006.01)

(52) U.S. Cl.
USPC .................................................. 119/792

(58) Field of Classification Search ............ 119/497, 119/792, 793, 856, 769
See application file for complete search history.

(56) References Cited

U.S. PATENT DOCUMENTS

| 4,644,902 | A | * | 2/1987 | Doyle | 119/497 |
| 5,644,902 | A | * | 7/1997 | Kemp | 54/37.1 |
| 6,827,044 | B2 | * | 12/2004 | Lobanoff et al. | 119/771 |
| 2008/0223311 | A1 | * | 9/2008 | Ito | 119/792 |

* cited by examiner

*Primary Examiner* — Monica Williams

(57) ABSTRACT

A diamond-shaped animal harness has a longitudinal primary center line and a latitudinal transverse center line, front and rear points, lateral first and second side points, an inside and an outside, a front edge between the side points including the front point, a rear edge between the side points including the rear point, and two leg holes on opposite sides of the primary center line closer to the primary center line than to the side points.

1 Claim, 3 Drawing Sheets

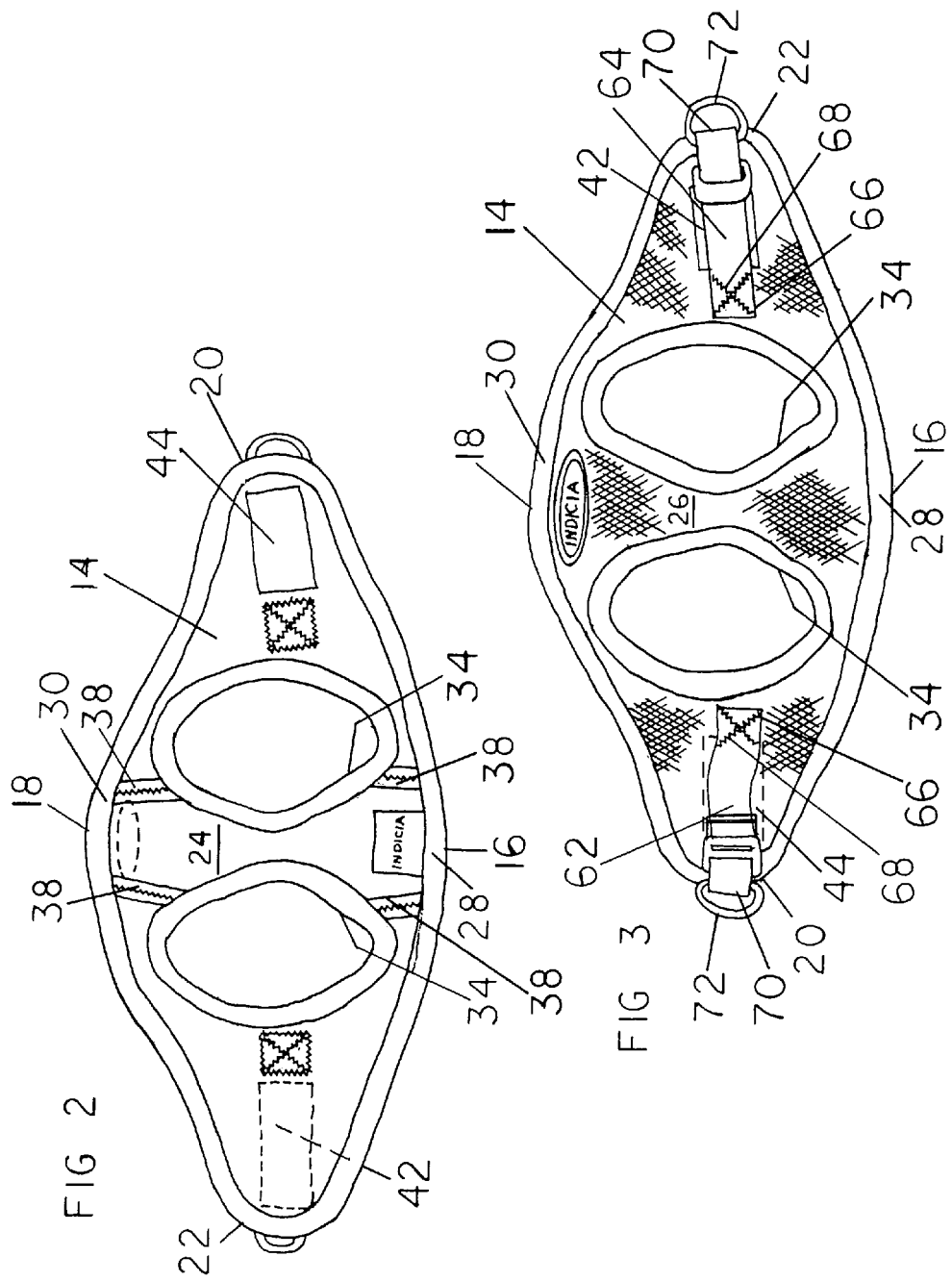

ULTRA CHOKE FREE HARNESS SYSTEM

BACKGROUND OF THE INVENTION

1. Field of the Invention

The present invention relates to a ultra choke free harness system and more particularly pertains to holding a dog remote from its neck in a safe, secure, convenient and economical manner.

2. Description of the Prior Art

The use of dog harnesses of known designs and configurations is known in the prior art. More specifically, dog harnesses of known designs and configurations previously devised and utilized for the purpose of holding dogs are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe an ultra choke free harness system that allows holding a dog remote from its neck in a safe, secure, convenient and economical manner.

In this respect, the ultra choke free harness system according to the present invention substantially departs from the conventional concepts and designs of the prior art, and in doing so provides an apparatus primarily developed for the purpose of holding a dog remote from its neck in a safe, secure, convenient and economical manner.

Therefore, it can be appreciated that there exists a continuing need for a new and improved ultra choke free harness system which can be used for holding a dog remote from its neck in a safe, secure, convenient and economical manner. In this regard, the present invention substantially fulfills this need.

SUMMARY OF THE INVENTION

In view of the foregoing disadvantages inherent in the known types of dog harnesses of known designs and configurations now present in the prior art, the present invention provides an improved ultra choke free harness system. As such, the general purpose of the present invention, which will be described subsequently in greater detail, is to provide a new and improved ultra choke free harness system and method which has all the advantages of the prior art and none of the disadvantages.

To attain this, the present invention essentially comprises a harness. The harness is in a generally diamond-shaped configuration. The harness has a longitudinal primary center line and a latitudinal transverse center line. The harness has a front point and a rear point. The harness has a length between the front and rear points when measured on the primary center line. The harness has lateral first and second side points and a width between the side points when measured on the transverse center line. The length to width ratio is between 0.35 to 1.00 and 0.45 to 1.00. The harness has an inside and an outside. The harness is positionable with the inside in contact with a dog wearing the harness. The harness has a front edge between the side points and including the front point. The harness has a rear edge between the side points and including the rear point. The harness, in the preferred embodiment, is fabricated of a polyester mesh fabric.

Two similarly shaped leg holes are next provided The leg holes are a first leg hole and a second leg hole. The leg holes extend through the harness on opposite sides of the primary center line. The leg holes are located closer to the primary center line than to the side points. The leg holes are positionable with the front legs of the dog extending there through.

Next provided are four similar V-seams on the inside of the harness. The V-seams are located between leg holes interiorly and the front and rear edges exteriorly. The V-seams extend essentially parallel with and essentially equally spaced from the primary center line. The V-seams are adapted to create a cupping effect for accommodating a curved breast of the dog for greater comfort and safety for the dog.

A first patch and a second patch of a hook and loop fastener are next provided. The first patch is located on the inside between the first leg hole and the first side point. The second patch being located on the outside between the second leg hole and the second side point. The patches are positionable in contact with each other above a back of the dog for thereby constituting a primary closure for the harness.

Next provided are a first webbing and a second webbing. Each webbing has an interior end with stitching coupling the interior ends to the outside of the harness between the patches and the leg holes. Each webbing has an exterior end with side release buckles to couple the exterior ends for thereby constituting a secondary closure for the harness above the primary closure.

A first strap and a second strap are next provided. Each of the straps has an inner end with X box stitching. The X box stitching couples the inner ends to the outside of the harness between the patches and the leg holes. Each strap also has an outer end with a side D-ring for attachment to a leash.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ultra choke free harness system which has all of the advantages of the prior art dog harnesses of known designs and configurations and none of the disadvantages.

It is another object of the present invention to provide a new and improved ultra choke free harness system which may be easily and efficiently manufactured and marketed.

It is further object of the present invention to provide a new and improved ultra choke free harness system which is of durable and reliable constructions.

An even further object of the present invention is to provide a new and improved ultra choke free harness system which is susceptible of a low cost of manufacture with regard to both materials and labor, and which accordingly is then susceptible of low prices of sale to the consuming public, thereby making such ultra choke free harness system economically available to the buying public.

Even still another object of the present invention is to provide an ultra choke free harness system for holding a dog remote from its neck in a safe, secure, convenient and economical manner.

Lastly, it is an object of the present invention to provide a new and improved dog harness in a diamond-shaped configuration having a longitudinal primary center line and a latitudinal transverse center line, front and rear points, lateral first and second side points, an inside and an outside, a front edge between the side points including the front point, a rear edge between the side points including the rear point, and two leg holes on opposite sides of the primary center line closer to the primary center line than to the side points.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a front elevational view of the ultra choke free harness system shown in FIG. 1.

FIG. 3 is a rear elevational view of the ultra choke free harness system shown in FIG. 1.

The same reference numerals refer to the same parts throughout the various Figures.

DESCRIPTION OF THE PREFERRED EMBODIMENT

Figure 1:
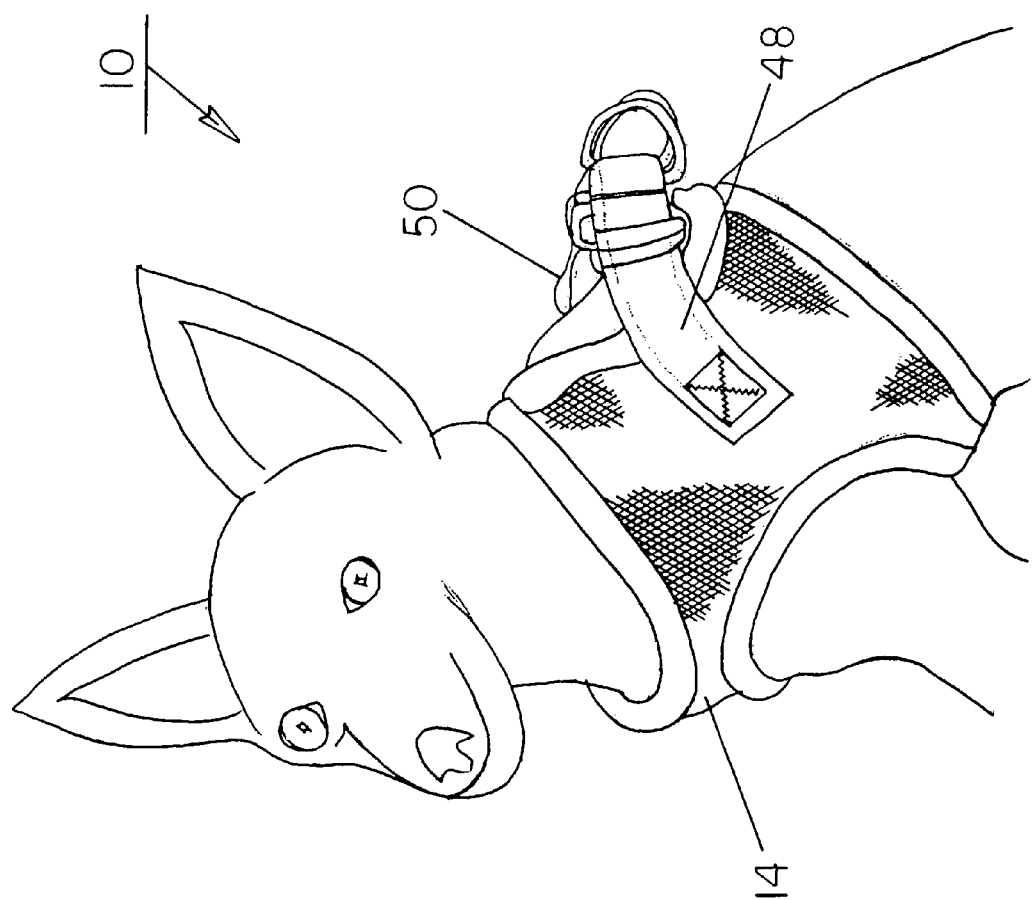
FIG. 1 is a perspective illustration of an ultra choke free harness system constructed in accordance with the principles of the present invention, the system being worn by a dog.

With reference now to the drawings, and in particular to FIG. 1 thereof, the preferred embodiment of the new and improved ultra choke free harness system embodying the principles and concepts of the present invention and generally designated by the reference numeral 10 will be described.

The present invention, the ultra choke free harness system 10 is comprised of a plurality of components. Such components are individually configured and correlated with respect to each other so as to attain the desired objective. The ultra choke free harness system 10 is for holding a dog remote from its neck. The holding is achieved in a safe, secure, convenient and economical manner.

First provided is a harness 14. The harness is in a generally diamond-shaped configuration. The harness has a longitudinal primary center line and a latitudinal transverse center line.

The harness has a front point 16 and a rear point 18. The harness has a length between the front and rear points when measured on the primary center line. The harness has lateral first and second side points 20, 22 and a width between the side points when measured on the transverse center line. The length to width ratio is between 0.35 to 1.00 and 0.45 to 1.00. The harness has an inside 24 and an outside 26. The harness is positionable with the inside in contact with a dog wearing the harness. The harness has a front edge 28 between the side points and including the front point. The harness has a rear edge 30 between the side points and including the rear point. The harness, in the preferred embodiment, is fabricated of a polyester mesh fabric.

Two similarly shaped leg holes 34, the leg holes being a first leg hole and a second leg hole, extend through the harness on opposite sides of the primary center line. The leg holes are located closer to the primary center line than to the side points. The leg holes are positionable with the front legs of the dog extending there through.

Next provided are four similar V-seams 38 on the inside of the harness. The V-seams are located between leg holes interiorly and the front and rear edges exteriorly. The V-seams extend essentially parallel with and essentially equally spaced from the primary center line. The V-seams are adapted to create a cupping effect for accommodating a curved breast of the dog for greater comfort and safety for the dog.

A first patch 42 and a second patch 44 of a hook and loop fastener are next provided. The first patch is located on the inside between the first leg hole and the first side point. The second patch being located on the outside between the second leg hole and the second side point. The patches are positionable in contact with each other above a back of the dog for thereby constituting a primary closure for the harness.

Next provided are a first webbing 48 and a second webbing 50. Each webbing has an interior end 52 with stitching 54 coupling the interior ends to the outside of the harness between the patches and the leg holes. Each webbing has an exterior end 56 with side release buckles 58 to couple the exterior ends for thereby constituting a secondary closure for the harness above the primary closure.

A first strap 62 and a second strap 64 are next provided. Each of the straps has an inner end 66 with X box stitching 68. The X box stitching couples the inner ends to the outside of the harness between the patches and the leg holes. Each strap also has an outer end 70 with a side D-ring 72 for attachment to a leash.

FIG. 1 is a perspective illustration of the choke free harness system of the present invention shown fastened on a dog.

FIG. 2 is an inside view of the harness opened flat. As illustrated, the V-seam is sewn back together, starts with a V cut and is then drawn together to help form a cup shape for the dog's chest. The back side of the Velcro, a hook and loop fastener, is shown. Note the X box stitching for the Velcro and webbing.

FIG. 3 is an outside view of the harness opened flat. Note the open halves of The secondary closure, the double slide side release buckle. Note the ¾ inch polyester webbing sewn on with reinforced X box stitching. There are two black nickel-plated D-rings for a leash connection. There are four V-seams on the front side.

Figure 4:
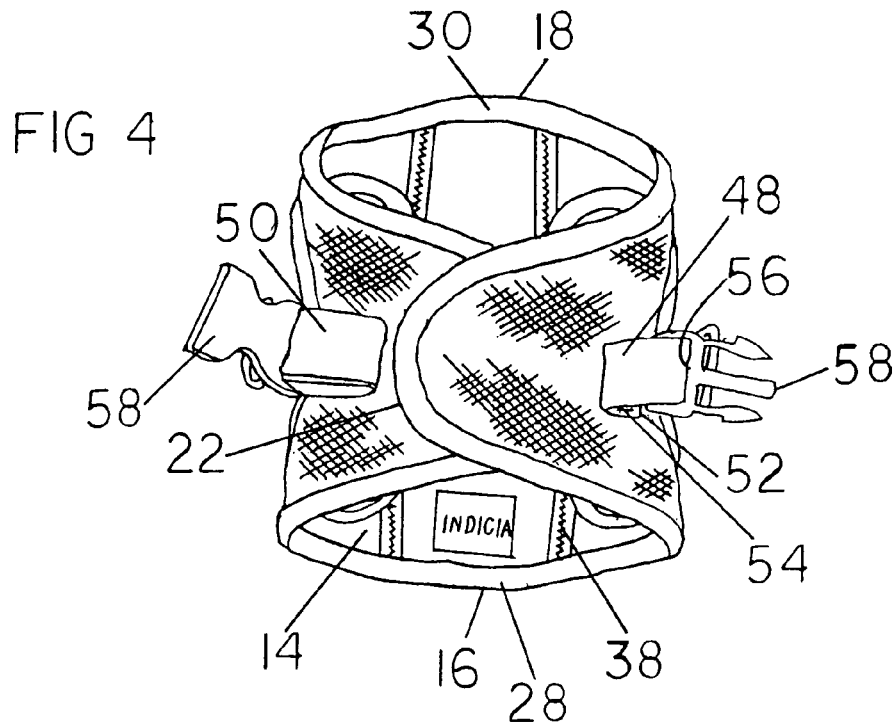
FIG. 4 is a perspective view of the ultra choke free harness system prior to being fully coupled.

FIG. 4 illustrates the harness with the primary closure with Velcro, hook and loop, to set size. Webbing is preferably made at a determined length to allow for adjustability in and out. This is a key factor in the design for creating an adjustable closure and harness.

The primary closure with Velcro, hook and loop, is adjustable to allow for different size chest on dog. Making it adjustable is one of the major keys to this design.

The secondary closure, the double slide side release buckle, allows the buckle to travel up and down the webbing which gives the harness its unique adjustability function. Other choke free harnesses do not have this second additional closure. It give the garment added security and also allows for it to be adjustable.

Figure 5:
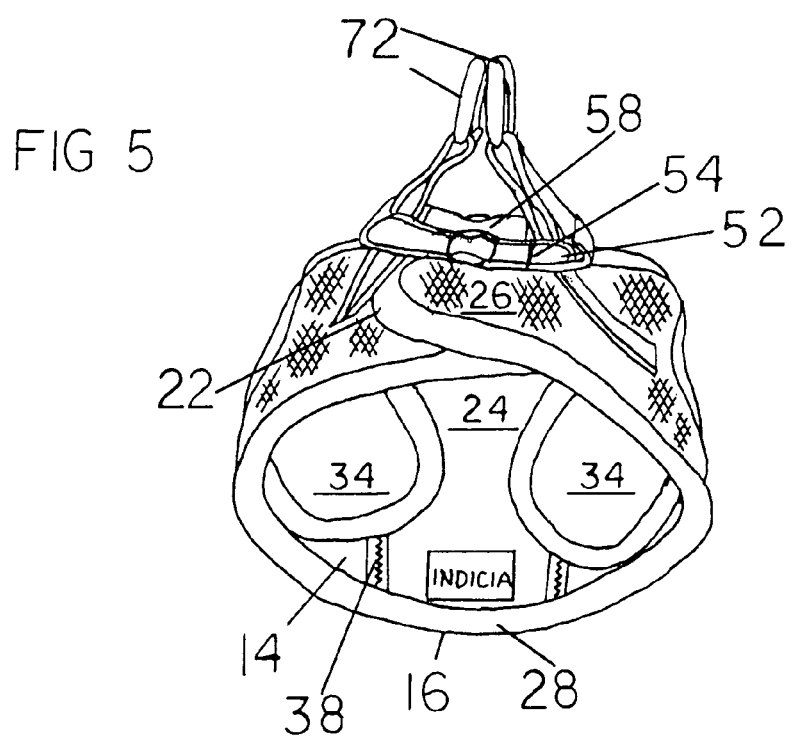
FIG. 5 is a perspective view of the ultra choke free harness system after being fully coupled.

FIG. 5 illustrates the harness fully closed with the secondary closure, a double slide side release buckle. There are two V-seams located front underside and back underside. The V-seam causes the fabric to craw in on the outer edge, thereby creating a cupping affect. Without this V-seam, the upper front and lower bottom would pooch out and not allow for a nice tight fit. It is equivalent to a cup on a bra. This allows the harness to fit around a dog's curved chest. The V-seam is critical also for safety. It causes the garment to fit snug and helps prevent the dog from pulling out of the harness.

Also, FIG. 5 shows the harness closed with both the primary closure, the Velcro closure, and closed all the way in and the secondary closure, the double slide side release buckle, with the webbing traveling through it. Above that is the D-Ring connections. It is the combination of all of these features that makes the harness have a double safety closure, webbing that has a measured length to allow for expansion of size, Velcro that can be set to tighten or loosen, and a double D-ring for extra strength.

The present invention is ultra choke free in that the closure is designed in a specific way. It only covers the chest and does not come in contact with the neck of the animal. The primary embodiment of the invention is designed for use as a harness for small to medium-sizes dogs. It should be understood, however, that the invention can also be used as a harness for larger dogs, for cats, and for other animals as well. In the preferred embodiment the material is a polyester mesh fabrics, but various fabrics may be used. The invention combines the main technical feature of the closure and how it closes, along with the ease of step in, and the choke free design.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ultra choke free harness system (10) for holding a dog remote from its neck, the holding being achieved in a safe, secure, convenient and economical manner, the system comprising, in combination:

a harness (14) in a generally diamond-shaped configuration, the harness having a longitudinal primary center line and a latitudinal transverse center line, the harness having a front point (16) and a rear point (18) and a length between the front and rear points when measured on the primary center line, the harness having lateral first and second side points (20) (22) and a width between the side points when measured on the transverse center line, the length to width ratio being between 0.35 to 1.00 and 0.45 to 1.00, the harness having in inside (24) and an outside (26), the harness being positionable with the inside in contact with a dog wearing the harness, the harness having a front edge (28) between the side points and including the front point, the harness having a rear edge (30) between the side points and including the rear point, the harness being fabricated of a polyester mesh fabric;

two similarly shaped leg holes (34), being a first leg hole and a second leg hole, extending through the harness on opposite sides of the primary center line, the latitudinal transverse center line passing through the two leg holes, the leg holes being located closer to the primary center line than to the side points, the leg holes being positionable with the front legs of the dog extending there through;

four similar seams (38) on the inside of the harness, the seams being located between the leg holes interiorly and the front and rear edges exteriorly, the seams extending essentially parallel with and essentially equally spaced from the primary center line;

a first patch (42) and a second patch (44) of a hook and loop fastener, the first patch being located on the inside between the first leg hole and the first side point, the second patch being located on the outside between the second leg hole and the second side point, the patches being positionable in contact with each other above a back of the dog for thereby constituting a primary closure for the harness;

a first webbing (48) and a second webbing (50), each webbing having an interior end (52) with stitching (54) coupling the interior ends to the outside of the harness between the patches and the leg holes, each webbing having an exterior end (56) with side release buckles (58) to couple the exterior ends for thereby constituting a secondary closure for the harness above the primary closure; and a first strap (62) and a second strap (64), each strap having an inner end (66) with X box stitching (68) coupling the inner ends to the outside of the harness between the patches and the leg holes, each strap having an outer end (70) with a side D-ring (72) for attachment to a leash.

* * * * *